US011843094B2

(12) United States Patent  
Chang et al.

(10) Patent No.: US 11,843,094 B2  
(45) Date of Patent: Dec. 12, 2023

(54) INFORMATION HANDLING SYSTEM WITH OPERATING SYSTEM DEPENDENT BATTERY MANAGEMENT

(71) Applicant: Dell Products L.P., Round Rock, TX (US)

(72) Inventors: Chia-Fa Chang, Linkou Township (TW); Shao-Szu Ho, New Taipei (TW); Wen-Yung Chang, Jhong Li (TW); Adolfo S. Montero, Pflugerville, TX (US); Chien-Hao Chiu, Bade District (TW)

(73) Assignee: Dell Products L.P., Round Rock, TX (US)

( * ) Notice: Subject to any disclaimer, the term of this patent is extended or adjusted under 35 U.S.C. 154(b) by 208 days.

(21) Appl. No.: 17/384,456

(22) Filed: Jul. 23, 2021

(65) Prior Publication Data

US 2023/0022911 A1      Jan. 26, 2023

(51) Int. Cl.  
*H01M 10/42* (2006.01)  
*H01M 10/48* (2006.01)

(52) U.S. Cl.  
CPC ......... *H01M 10/425* (2013.01); *H01M 10/48* (2013.01); *H01M 2010/4271* (2013.01); *H01M 2010/4278* (2013.01)

(58) Field of Classification Search  
CPC ............... H01M 10/425; H01M 10/48; H01M 2010/4271; H01M 2010/4278  
See application file for complete search history.

(56) References Cited

U.S. PATENT DOCUMENTS

2020/0052519 A1*  2/2020  Thompson ................ H02J 7/02

* cited by examiner

*Primary Examiner* — Victoria H Lynch  
(74) *Attorney, Agent, or Firm* — Jackson Walker L.L.P

(57) ABSTRACT

An information handling system is configured to implement a battery management method and perform battery management operations including receiving information indicative of an operating system associated with the information handling system and determining a battery behavior environment (BBE) based, at least in part, on the operating system. A battery management unit (BMU) profile associated with the battery behavior environment may be selected, wherein the BMU profile indicates settings for one or more battery management parameters. The BMU is then configured in accordance with the BMU profile and the battery is managed in accordance with the BMU profile.

14 Claims, 5 Drawing Sheets

FIG. 3

INFORMATION HANDLING SYSTEM WITH OPERATING SYSTEM DEPENDENT BATTERY MANAGEMENT

TECHNICAL FIELD

The present disclosure relates to information handling system display devices and, more specifically, the management of information handling system power supply subsystems including batteries.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include some form of battery-based DC power supply, often including a multi cell battery pack and corresponding charging circuitry managed by a battery management unit (BMU). For a variety of inventory management reasons, original equipment manufacturers may elect to confine the number of BMU suppliers, sometimes using as few as two primary BMU suppliers, to avoid costs and logistical complexity associated with tracking a greater number of parts. In addition, from a risk management perspective, fewer stock-keeping units (SKUs) generally reduces the risk of a potentially unsafe part mix-up.

With each successive generation of batteries, original equipment manufacturers (OEMs) also tend to have a strong preference for re-using existing BMU chips and, perhaps even more ambitiously, maintaining the existing framework of BMU firmware to the greatest extent possible, maintaining a consistent superset of BMU capabilities, while delegating fine tuning of operational parameters to the battery suppliers.

SUMMARY

In accordance with subject matter disclosed in the following detailed description, an information handling system is configured to implement a battery management method and perform battery management operations including receiving information indicative of an operating system (OS) associated with the information handling system and determining a battery behavior environment (BBE) based, at least in part, on the operating system. A BMU profile associated with the battery behavior environment may be selected, wherein the BMU profile indicates settings for one or more battery management parameters. The BMU is then configured in accordance with the BMU profile and the battery is management in accordance with the BMU profile.

In some embodiments, the operating system is detected by BIOS at runtime, e.g., as part of a boot sequence, and reported to the platform's embedded controller or equivalent (e.g., a baseboard management controller in a server-class system). The BBE determination may be performed by the EC, the BMU, or a combination of both. The BBE determination may be based on a factors including, without limitation, a combination of the operating system and a battery associated with the applicable battery make and model. In some instances, two operating system types may be associated with a common battery behavior environment. For example two platforms with different operating systems may share a common CPU, chipset, embedded controller, firmware, battery, and BMU firmware and, in at least some implementations, a BMU may treat these two in the same way or substantially the same way. Conversely, two platforms that share a common operating system may have different battery management profiles.

In various embodiments, the BMU profile may be selected determined based on a combination of any one or more of the following parameters, a battery type, wherein the battery type includes a battery capacity and a battery cell count, a battery vendor, a battery model, embedded controller firmware, and configurable battery settings associated with the battery model, as well as other parameters not explicitly listed here. In some embodiments, determining the battery behavior environment for a platform may include determining whether the system satisfies one or more battery mode criteria. As an example, if a battery may include the battery wherein the battery mode criteria is indicated by values in one or more battery configuration registers.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates a configurable battery information table that may be accessed and utilized by a battery management module;

DETAILED DESCRIPTION

Figure 1:
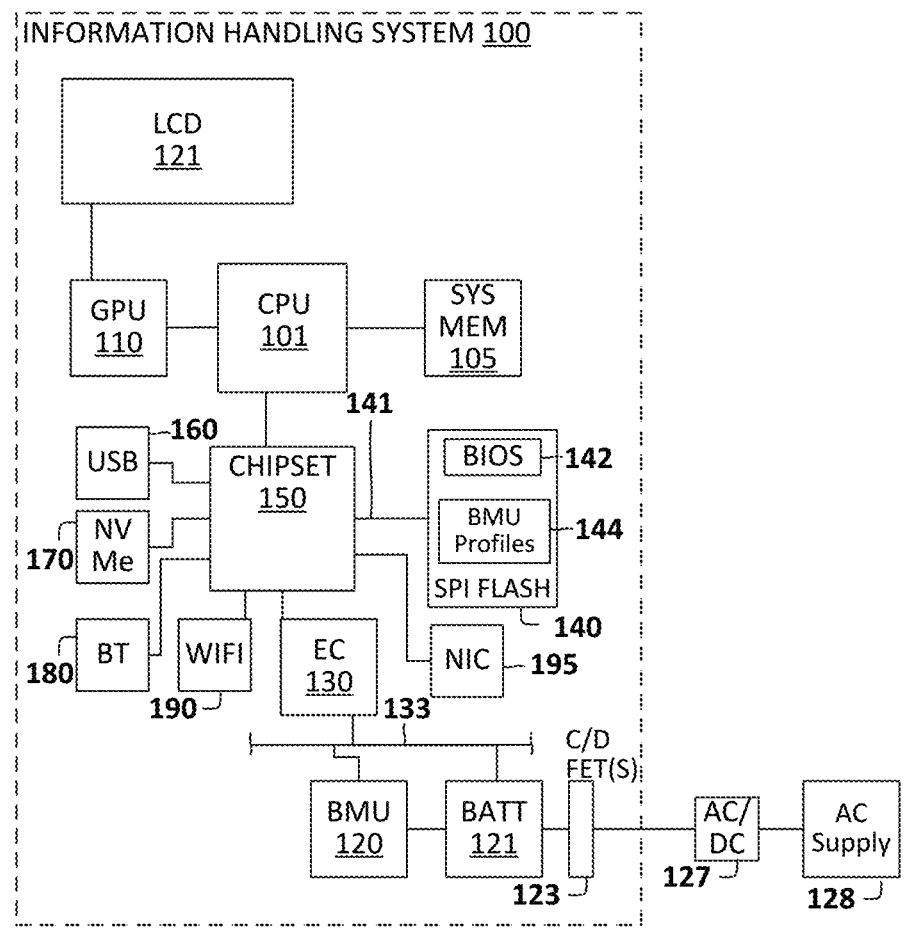
FIG. 1 illustrates an information handling system.

Exemplary embodiments and their advantages are best understood by reference to FIGS. 1-5, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the sake of brevity, the word "platform" may be used in this description in lieu of the term "information handling system."

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates a block diagram of an information handling system 100, also referred to herein simply as platform 100, suitable for use in conjunction with disclosed battery management methods. The illustrated platform 100 includes a central processing unit (CPU) 101 coupled to a system memory 105 and a graphics processing unit (GPU) 110, which is further connected to a liquid crystal display (LCD) device 121. A chipset 150 coupled to CPU 101 couples various peripheral device interfaces and expansion buses to CPU 101, enabling various peripheral devices to communicate with CPU 101.

The peripheral devices coupled to the chipset 150 illustrated in FIG. 1 include a flash memory storage device identified as SPI flash 140, so named due to the serial peripheral interface (SPI) bus 141 that SPI flash 140 is coupled to. SPI flash 140 is illustrated with BIOS code 142 and BMU profile data 144 stored within.

In addition to flash device 140, the peripheral resources illustrated in FIG. 1 include a USB host controller 160, a nonvolatile memory express (NVMe) storage resource 170, a Bluetooth adapter 180, a Wi-Fi host controller interface 190, a network interface card (NIC) 195, and an embedded controller 130 coupled between chipset 150 and a system management bus 133, which may be implemented in accordance with an SMBus standard. The illustrated platform 100 further includes a rechargeable multi-cell battery pack, referred to herein simply as battery 121, coupled to a BMU 120, both of which are connected to system management bus 133. FIG. 1 further illustrates charge/discharge field effect transistor (C/D FET(s)) 123 suitable for coupling and decoupling battery 121 with a battery recharger (not explicitly illustrated in FIG. 1) and with an external power source such as the output of an external AC/DC adapter 127 coupled to an AC voltage supply 128.

Although FIG. 1 illustrates a specific combination of components and configurations, those of ordinary skill in the design of information handling systems will appreciate that other embodiments may employ more, fewer, and/or different components.

Figure 2:
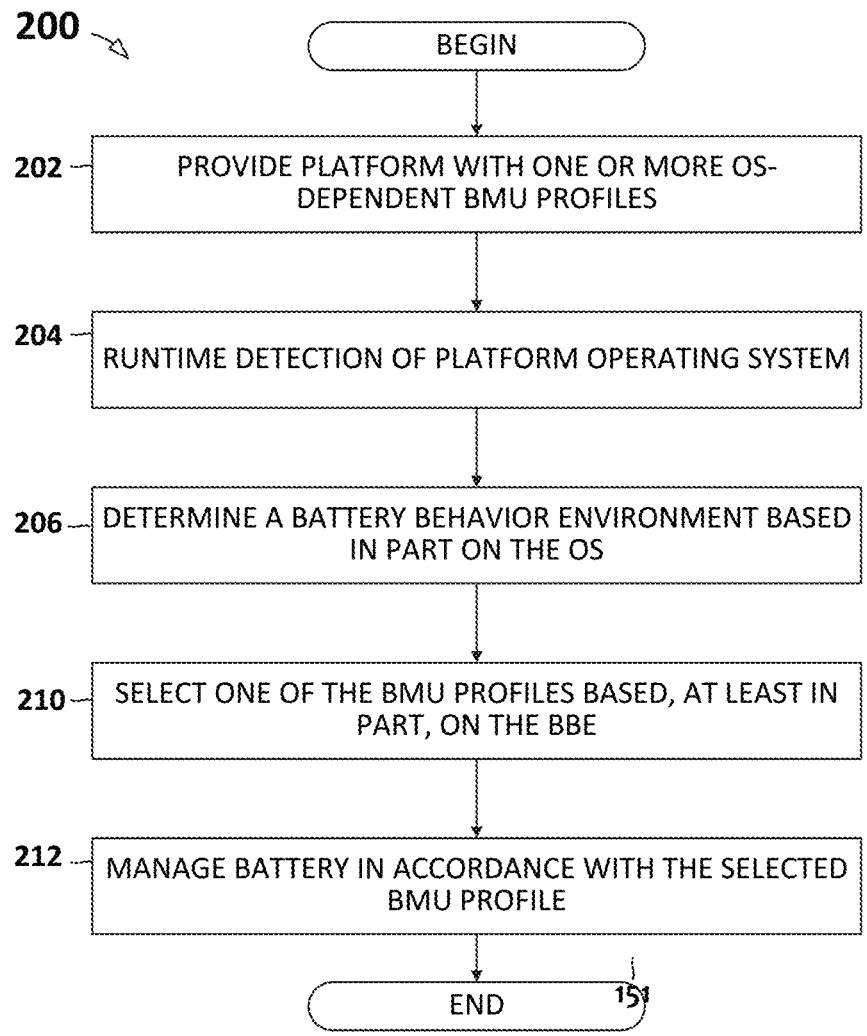
FIG. 2 illustrates a method of managing a battery across platforms with different operating system types, different battery-specific hardware, and/or different battery behavior environments.

Referring now to FIG. 2, a battery management method 200 suitable for the platform 100 of FIG. 1 is illustrated. The method 200 illustrated in FIG. 2 enables a BMU to implement OS-specific battery management configurations and/or behavior optimizations, thereby extending the utility of BMU 120 to a potentially diverse group of platforms and batteries while also supporting simplified SKU management logistics for the OEM.

As depicted in FIG. 2, method 200 begins by storing or otherwise providing (step 202) one or more OS-dependent BMU profiles in NVMe 170, SPI flash 140, or another suitable storage resource of platform 100. The illustrated method may then perform a run-time detection (step 204) of the platform's operating system. In at least one embodiment, the run time detection of the operating system is performed by BIOS 142 (FIG. 1) during a boot sequence. BIOS 142 may convey the OS information to embedded controller 130 or another suitable platform component. The illustrated method 200 may then determine (operation 206) a battery behavior environment of the platform based, at least in part, on the operating system as well as any additional battery-specific or battery-relevant parameters, hardware, or circuitry.

The method 200 illustrated in FIG. 2 may next select (step 210) one of the BMU profiles 144 based at least in part on the battery behavior environment determined in step 206. The illustrated method 200 may then manage (block 212) the platform battery in accordance with the applicable profile.

In some cases, battery behavior may be influenced by one or more parameters in addition to the OS type. As an example, two or more system types may share an OS in common, but may nevertheless have dramatically different battery behavior and dramatically different workload histories. In this example, the two platforms may be managed according to two distinct BMU profiles.

Expanding on the previous example, the dramatically different workload and usage histories may correlate to a line of business parameter indicative of a targeted customer or market for a particular platform. Platforms sold into an education market, as an example, may be largely inactive for extended stretches due to summer vacation and, in at least some embodiments, a corresponding BMU profile may be employed. The BMU may, as an example, invoke an "extended break" configuration and/or algorithm on certain OS platforms intended for the education market, but not on corporate platforms for the same OS type or platforms with a different OS type, e.g., employ an extended break BMU configuration on education market platforms with a Google Chrome OS type.

As another example of an OS-influenced battery management behavior, the BMU may be able to activate an OS-specific voltage scaling model for top-up charging. As an example of a hardware-specific BMU behavior, two platforms that share a common OS type and battery type may have different battery hardware configurations that impact BMU behavior. For cost savings reasons, some lower priced platforms may omit battery circuitry needed in conjunction with certain functionality. For example, a one-shot circuit may be required to support an advanced storage mode feature in some platforms. If the one-shot circuit is omitted, the platform may be unable to wake from advanced storage mode. In such cases, the BMU may be configured not to permit advanced storage mode unless the presence of the required circuitry is confirmed. Conversely, the BMU may automatically enable advanced storage mode functionality upon detecting the presence of the one-shot circuit. As another example, A long life behavior of the battery can also depend on OS type if OS vendors differ in their support of a business model to monetize a long-life battery warranty upgrade.

Figure 3:
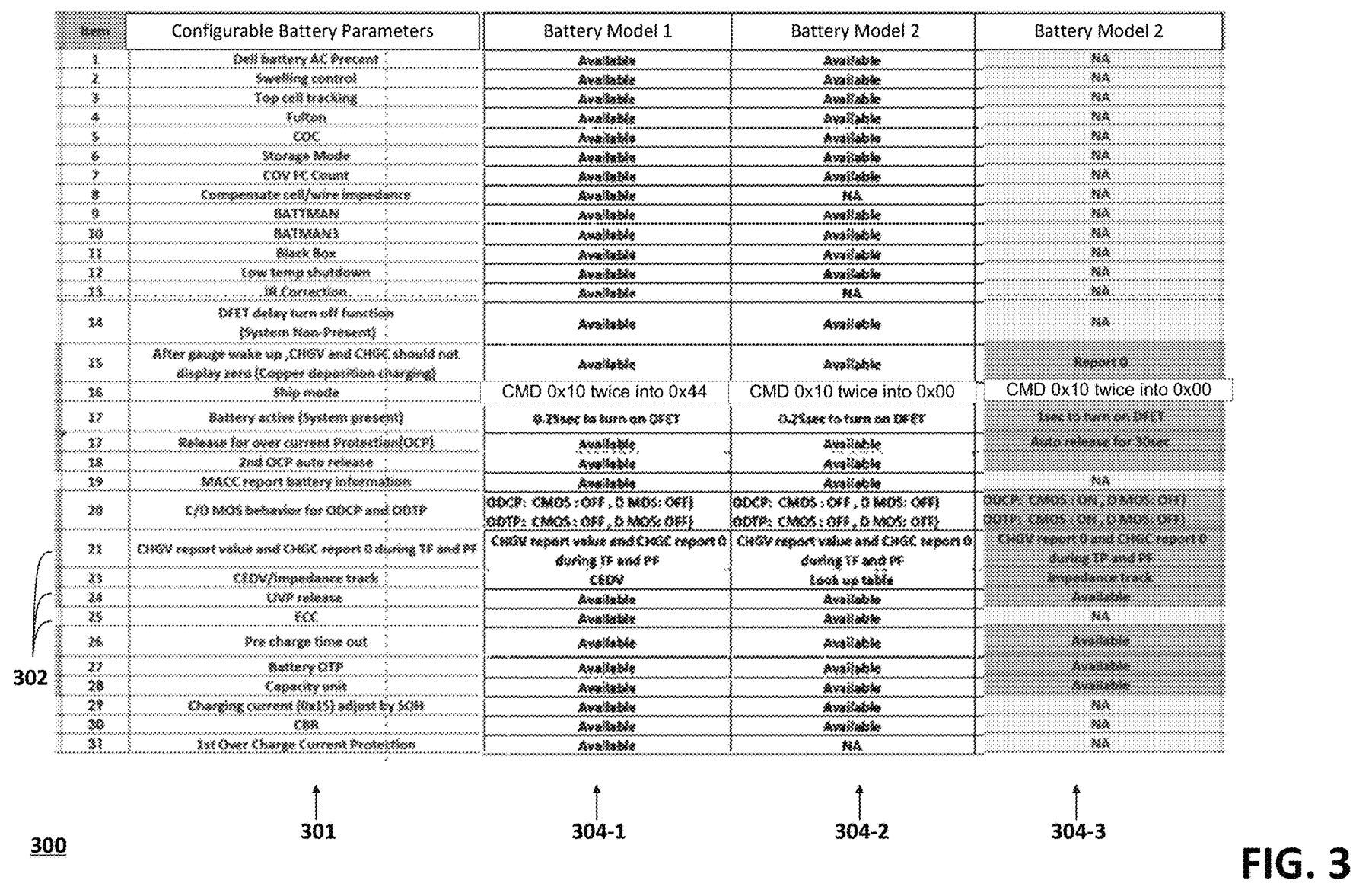

Referring now to FIG. 3, a data table referred to as battery configuration table 300 is illustrated. The illustrated battery configuration table 300 lists a plurality of configurable battery parameters 302 that any of the particular battery models may include or support. For each configurable parameter 302, battery configuration table 300 indicates which of various battery models 304 include or support the parameter. The configurable parameters supported by a particular battery may influence the available battery management options and thereby influence BMU behavior.

Figure 4:
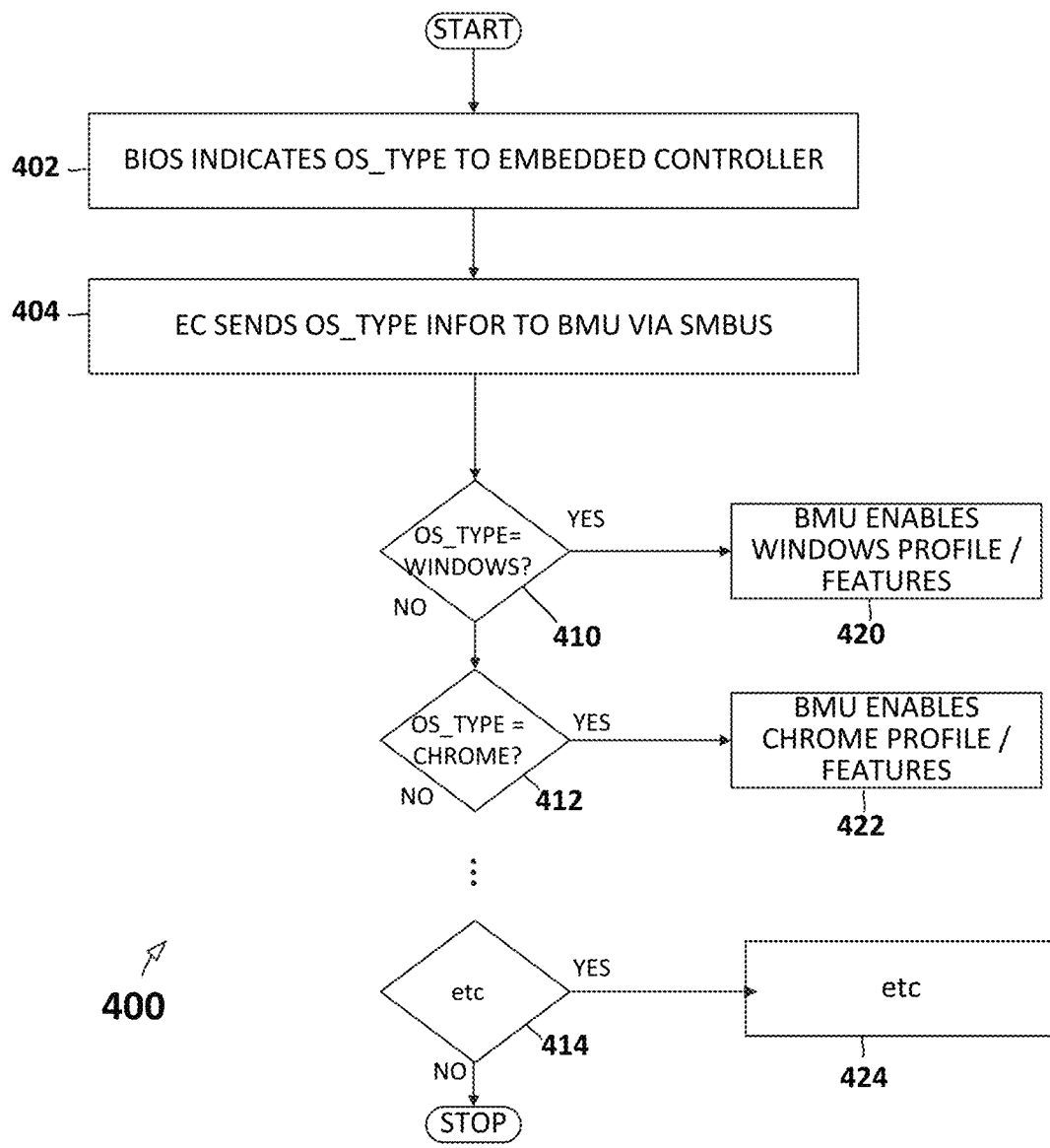
FIG. 4 illustrates a second method of managing a battery across platforms with different operating system types and/ or different battery hardware.

Referring now to FIG. 4, a method for managing an information handling system battery is illustrated in flow diagram format. The method 400 illustrated in FIG. 4 includes (step 402) a BIOS module indicating an OS type to an embedded controller. The embedded controller may then send (step 404) OS_type information to the battery management unit via a system management bus (SMBus) or another suitable serial protocol.

After the OS_type information has been sent, method 400 flows through a sequence of decision blocks 410, 412, and 414, each of which determines whether a particular OS_type is present. If not, the illustrated method proceeds to the next decision block until all valid OS_types have been checked. If the particular OS type is present, the BMU enables (steps 412, 422) one or more BMU profiles and/or features applicable to the OS_type.

Figure 5:
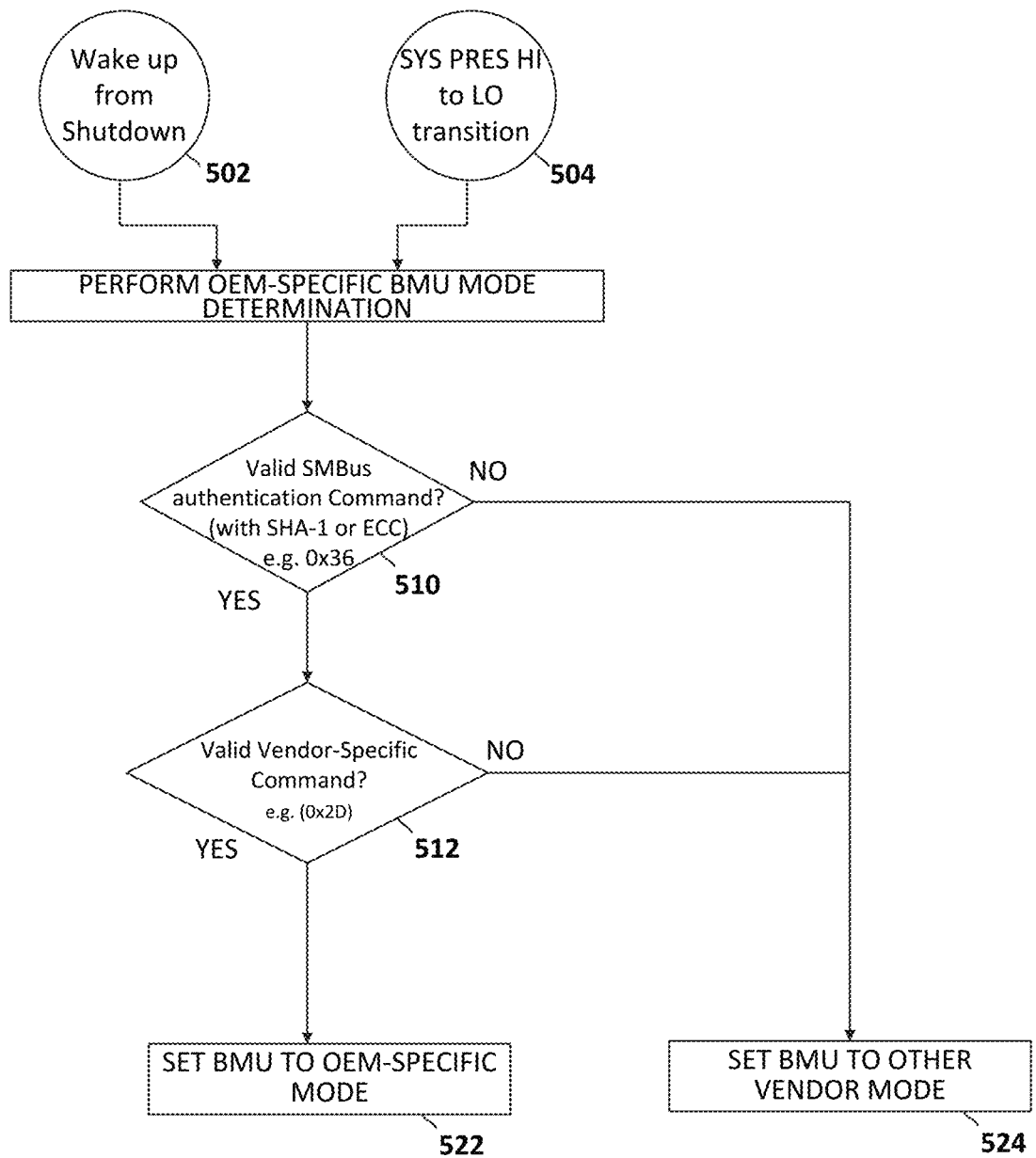
FIG. 5 illustrates a battery management mode selection process.

FIG. 5 illustrates an embodiment in which one or more electrically detectable criteria are evaluated, in combination with the OS type, to determine whether to invoke a battery management policy or mode specific to a particular OEM or vendor. Upon waking (502) from shutdown or detecting (504) a system high to low transition, the BMU or EC may perform an OEM-specific determination (501) based on satisfaction of two conditions. As illustrated in FIG. 5, the first condition (510) is met by a valid authentication command (e.g., 0x36) with SHA-1 or ECC, and the second condition (512) is met by a valid OEM-specific command, e.g., 0x2D, If both of conditions are true, then the illustrated feature 500 is enabled (522) to invoke an OEM-specific BMU policy. If either condition is false, the BMU is set (524) to an "other vendor" mode.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A battery management method for an information handling system, the method comprising:
- receiving information indicative of an operating system associated with the information handling system;
- determining a battery behavior environment (BBE) based, at least in part, on the operating system and wherein determining the BBE includes determining whether the operating system satisfies a battery mode criteria, wherein the battery mode criteria are indicated by values in one or more battery configuration registers;
- accessing a battery management unit (BMU) profile associated with the battery behavior environment, wherein the BMU profile indicates settings for one or more battery management parameters; and
- configuring the BMU in accordance with the BMU profile.

2. The method of claim 1, wherein receiving the information indicative of the operating system comprises receiving the information from BIOS.

3. The method of claim 1, wherein determining the BBE includes determining the BBE based on a combination of the operating system and battery hardware associated with a make and a model of the battery.

4. The method of claim 1, wherein two operating system types are associated with a common battery behavior environment.

5. The method of claim 1, wherein a single operating system type is associated with two or more battery behavior environments.

6. The method of claim 1, wherein the BMU profile is selected based on a combination of any one or more of: a battery type, a battery vendor, a battery model, embedded controller firmware, or configurable battery settings associated with the battery model.

7. The method of claim 1, wherein the battery configuration registers are accessible via a system management bus (SMBus).

8. An information handling system comprising:
- a central processing unit (CPU);
- an embedded controller communicatively coupled to the CPU;
- a battery management unit (BMU) coupled to the embedded controller;
- a battery coupled to the BMU; and
- a system memory, accessible to the CPU, including processor executable instructions that when executed by the CPU cause the information handling system perform battery management operations including:
- receiving information indicative of an operating system associated with the information handling system;
- determining a battery behavior environment (BBE) based, at least in part, on the operating system wherein determining the BBE includes determining whether the operating system satisfies a battery mode criteria, wherein the battery mode criteria are indicated by values in one or more battery configuration registers;
- accessing a battery management unit (BMU) profile associated with the battery behavior environment, wherein the BMU profile indicates settings for one or more battery management parameters; and
- configuring the BMU in accordance with the BMU profile.

9. The information handling system of claim 8, wherein receiving the information indicative of the operating system comprises receiving the information from BIOS.

10. The information handling system of claim 8, wherein determining the BBE includes determining the BBE based on a combination of the operating system and battery hardware associated with a make and a model of the battery.

11. The information handling system of claim 8, wherein a single operating system type is associated with two or more battery behavior environments.

12. The information handling system of claim 8, wherein the BMU profile is selected determined based on a combination of any one or more of: a battery type, a battery vendor, a battery model, embedded controller firmware, or configurable battery settings associated with the battery model.

13. The information handling system of claim 8, wherein the battery configuration registers are accessible via a system management bus (SMBus).

14. An information handling system comprising: a central processing unit (CPU);
- an embedded controller communicatively coupled to the CPU;
- a battery management unit (BMU) coupled to the embedded controller;
- a battery coupled to the BMU; and
- a system memory, accessible to the CPU, including processor executable instructions that when executed by the CPU cause the information handling system perform battery management operations including:
- receiving information indicative of an operating system associated with the information handling system;
- determining a battery behavior environment (BBE) based, at least in part, on the operating system;
- accessing a battery management unit (BMU) profile associated with the battery behavior environment, wherein the BMU profile indicates settings for one or more battery management parameters; and
- configuring the BMU in accordance with the BMU profile, wherein two operating system types are associated with a common battery behavior environment.

* * * * *